(12) United States Patent
Lents et al.

(10) Patent No.: US 11,371,430 B2
(45) Date of Patent: *Jun. 28, 2022

(54) POWER SYSTEM FOR AIRCRAFT PARALLEL HYBRID GAS TURBINE ELECTRIC PROPULSION SYSTEM

(71) Applicant: Raytheon Technologies Corporation, Farmington, CT (US)

(72) Inventors: Charles E. Lents, Amston, CT (US); Jonathan Rheaume, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1728 days.

This patent is subject to a terminal disclaimer.

(21) Appl. No.: 15/200,240

(22) Filed: Jul. 1, 2016

(65) Prior Publication Data

US 2018/0003109 A1 Jan. 4, 2018

(51) Int. Cl.
| | |
|---|---|
| *F02C 6/14* | (2006.01) |
| *F02C 3/24* | (2006.01) |
| *F02C 3/22* | (2006.01) |
| *F01D 15/10* | (2006.01) |
| *B64D 41/00* | (2006.01) |
| *F02C 7/32* | (2006.01) |
| *B64D 27/24* | (2006.01) |
| *B64D 27/10* | (2006.01) |

(52) U.S. Cl.
CPC ............... *F02C 6/14* (2013.01); *B64D 27/10* (2013.01); *B64D 27/24* (2013.01); *B64D 41/00* (2013.01); *F01D 15/10* (2013.01); *F02C 3/22* (2013.01); *F02C 3/24* (2013.01); *F02C 7/32* (2013.01); *B64D 2221/00* (2013.01); *F05D 2220/76* (2013.01); *F05D 2260/42* (2013.01); *F05D 2260/85* (2013.01)

(58) Field of Classification Search
CPC .... F02K 3/06; F02K 5/00; F02C 7/268; F02C 7/275; F02C 7/32; F01D 15/10; F05D 2220/36; F05D 2220/50; B64D 2027/026; B64D 2221/00
See application file for complete search history.

(56) References Cited

U.S. PATENT DOCUMENTS

| | | |
|---|---|---|
| 5,899,411 A | 5/1999 | Latos et al. |
| 7,117,683 B2 | 10/2006 | Thompson |
| 7,380,749 B2 | 6/2008 | Fucke et al. |
| 7,882,691 B2 | 2/2011 | Lemmers, Jr. et al. |

(Continued)

*Primary Examiner* — Todd E Manahan
*Assistant Examiner* — Kyle Robert Thomas
(74) *Attorney, Agent, or Firm* — Carlson, Gaskey & Olds, P.C.

(57) ABSTRACT

A gas turbine engine includes a compressor section having a first compressor and a second compressor and a turbine section having a first turbine and a second turbine. The first compressor is connected to the first turbine via a first shaft and the second compressor is connected to the second turbine via a second shaft. A motor connected to the first shaft such that rotational energy generated by the motor is translated to the first shaft. A power distribution system connects the motor to a stored power system including at least one of an energy storage unit and a supplementary power unit. The power distribution system is configured to provide power from the stored power system to the motor.

19 Claims, 2 Drawing Sheets

(56) References Cited

U.S. PATENT DOCUMENTS

| | | |
|---|---|---|
| 8,727,270 B2 | 5/2014 | Burns et al. |
| 2006/0102790 A1 | 5/2006 | Atkey et al. |
| 2006/0260323 A1 | 11/2006 | Moulebhar |
| 2007/0151258 A1 | 7/2007 | Gaines et al. |
| 2008/0070078 A1 | 3/2008 | Gummalla et al. |
| 2012/0104842 A1* | 5/2012 | Moore .................. H02J 3/1821 307/9.1 |
| 2012/0138737 A1 | 6/2012 | Bruno et al. |
| 2014/0119885 A1* | 5/2014 | Orlando .................... F02C 7/36 415/68 |
| 2014/0245748 A1* | 9/2014 | Anghel .................. F01D 15/10 60/783 |
| 2014/0338352 A1* | 11/2014 | Edwards ................. F02C 3/113 60/774 |
| 2015/0128597 A1* | 5/2015 | Schlak .................... F03B 13/00 60/719 |
| 2015/0151847 A1* | 6/2015 | Krug ...................... B64D 41/00 307/9.1 |
| 2015/0251766 A1* | 9/2015 | Atkey .................... B64D 13/08 244/13 |
| 2015/0330869 A1* | 11/2015 | Ziarno .................. G01M 15/14 701/34.4 |
| 2016/0076461 A1* | 3/2016 | Kawai ....................... F02C 9/40 60/772 |
| 2017/0225573 A1* | 8/2017 | Waltner .................. B64C 27/12 |

* cited by examiner

POWER SYSTEM FOR AIRCRAFT PARALLEL HYBRID GAS TURBINE ELECTRIC PROPULSION SYSTEM

The subject of this disclosure was made with government support under Contract No.: NNC14CA32C awarded by NASA. The government therefore may have certain rights in the disclosed subject matter.

TECHNICAL FIELD

The present disclosure relates generally to hybrid gas turbine electric jet engines, and more specifically to a power distribution system for the same.

BACKGROUND

Gas turbine engines compress air in a compressor section, combine the compressed air with a fuel, ignite the mixture in a combustor section, and expand the resultant combustion products across a turbine section. The expansion of the combustion products drives the turbine section to rotate. The turbine section is connected to the compressor section via one or more shafts, and the rotation of the turbine section drives the rotation of the compressor section. In turbofan gas turbine engines, a fan is similarly connected to a shaft, and driven to rotate by the turbine section. In a geared turbofan, there is a gear set driven by the shaft allowing the fan to rotate at a different (slower) speed than the shaft.

Typical gas turbine engines are designed such that the peak operational efficiency occurs when the engine is operated during one or both of takeoff or top of climb (alternately referred to as climb out) conditions. During these conditions, the gas turbine engine requires the maximum amounts of thrust output of all the operational modes. The efficiency designs impact the size of the engine components, and the temperatures at which the engine components run during each phase of engine operations. By way of example, during cruise operations, an aircraft requires less thrust, and the gas turbine engine is operated at cooler temperatures. Since the typical gas turbine engine is designed for peak efficiency during takeoff or top of climb, where the turbine inlet temperature is at its maximum allowable limit for best efficiency and highest thrust, the gas turbine engine is operated at a lower efficiency during other modes, such as cruise, where the turbine inlet temperature is below the maximum allowable limit.

SUMMARY OF THE INVENTION

In one exemplary embodiment a gas turbine engine includes a compressor section having a first compressor and a second compressor, a turbine section having a first turbine and a second turbine. The first compressor is connected to the first turbine via a first shaft, the second compressor is connected to the second turbine via a second shaft, a motor connected to the first shaft such that rotational energy generated by the motor is translated to the first shaft, and a power distribution system connecting the motor to a stored power system including at least one of an energy storage unit and a supplementary power unit, wherein the power distribution system is configured to provide power from the stored power system to the motor.

In another example of the above described gas turbine engine the power distribution system is isolated within the gas turbine engine.

In another example of any of the above described gas turbine engines the power distribution system is integrated with an aircraft power distribution system.

In another example of any of the above described gas turbine engines the power distribution system is connected to at least one aircraft electric system, and is configured to provide operational power to the at least one aircraft electric system.

In another example of any of the above described gas turbine engines the stored power system includes an energy storage unit and a supplementary power unit.

In another example of any of the above described gas turbine engines the at least one supplementary power unit comprises one of a liquid hydrocarbon combustion engine, a gaseous hydrocarbon combustion engine, and a proton exchange membrane (PEM) fuel cell.

In another example of any of the above described gas turbine engines the at least one energy storage unit comprises a rechargeable electric energy storage component.

In another example of any of the above described gas turbine engines the gas turbine engine includes at least a takeoff mode of operation, a top of climb mode of operation and a cruise mode of operation, wherein the gas turbine engine is configured to operate at peak efficiency in the cruise mode of operation.

In another example of any of the above described gas turbine engines the power distribution system is configured such that electricity generated by the motor is provided to the energy storage unit.

Another example of any of the above described gas turbine engines further includes a controller, the controller configured to cause the motor to operate as an electric generator during at least one mode of operation other than the takeoff mode of operation and the top of climb mode of operation, and configured to cause the motor to provide boost power to the gas turbine engine during at least one of the takeoff and climb out modes of operation.

In another example of any of the above described gas turbine engines the power distribution system includes an electric inlet configured to connect to, and receive power from, a ground based power station.

In one exemplary embodiment a gas turbine engine includes a compressor section having a first compressor and a second compressor, a turbine section having a first turbine and a second turbine. The first compressor is connected to the first turbine via a first shaft, the second compressor is connected to the second turbine via a second shaft, a motor connected to the first shaft such that rotational energy generated by the electric motor is translated to the first shaft, a power distribution system connecting the motor to an energy storage unit and a supplementary power unit, and wherein the supplementary power unit is electrically connected to the motor via the power distribution system such that electricity from the supplementary power unit drives rotation of the motor.

In another example of the above described gas turbine engine the supplementary power unit is a combustion engine driven by at least one of a liquid hydrocarbon based fuel and a gaseous hydrocarbon based fuel.

In another example of any of the above described gas turbine engines the energy storage unit is a rechargeable electric storage unit.

In another example of any of the above described gas turbine engines the motor is configured as a generator in at least one mode of engine operations.

In another example of any of the above described gas turbine engines the power distribution system is configured such that at least a portion energy generated by the generator is stored within the energy storage component.

In another example of any of the above described gas turbine engines the gas turbine engine includes at least a takeoff mode of operation, a top of climb mode of operation and a cruise mode of operation, wherein the gas turbine engine is configured to operate at peak efficiency in the cruise mode of operation.

In another example of any of the above described gas turbine engines the power distribution system is configured such that electricity generated by the motor is provided to the energy storage unit.

Another example of any of the above described gas turbine engines further includes a controller, the controller configured to cause the motor to operate as an electric generator during the cruise mode of operation, and configured to cause the motor to provide boost power to the gas turbine engine during at least one of the takeoff and climb out modes of operation.

An exemplary method for operating a gas turbine engine includes operating a gas powered turbine engine at a peak efficiency during a first mode of operation, providing power to the gas turbine engine from a motor when the engine is operating in a second mode of operation, where the second mode of operation has a higher thrust requirement than the first mode of operation, and generating at least a portion of the power provided to the motor using a supplemental power unit, wherein the supplemental power unit converts a fuel expenditure into electric power.

These and other features of the present invention can be best understood from the following specification and drawings, the following of which is a brief description.

DETAILED DESCRIPTION OF AN EMBODIMENT

Figure 1:
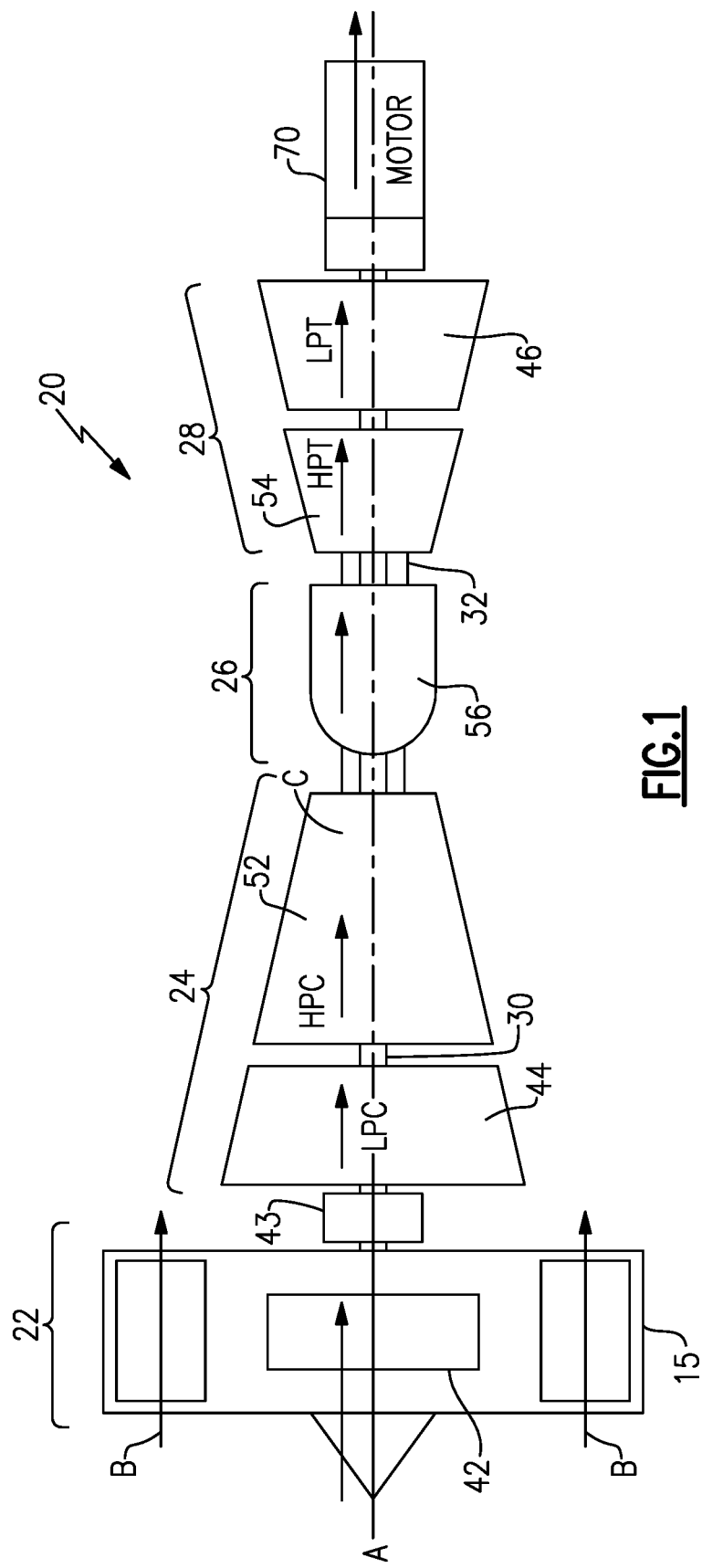
FIG. 1 schematically illustrates an exemplary gas turbine engine according to one embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure via several bearing systems. It should be understood that various bearing systems at various locations may be provided.

The low speed spool 30 generally includes an inner shaft that interconnects a fan 42, a first (or low) pressure compressor 44 and a first (or low) pressure turbine 46. The inner shaft is connected to the fan 42 through a speed change mechanism (such as gear system 43), which in exemplary gas turbine engine 20 is illustrated as a geared architecture to drive the fan 42 at a lower speed than the low speed spool 30. The high speed spool 32 includes an outer shaft that interconnects a second (or high) pressure compressor 52 and a second (or high) pressure turbine 54. A combustor 56 is arranged in the exemplary gas turbine engine 20 between the high pressure compressor 52 and the high pressure turbine 54. In some examples, a mid-turbine frame of the engine static structure is arranged generally between the high pressure turbine 54 and the low pressure turbine 46. The mid-turbine frame further supports bearing systems within the turbine section 28. The inner shaft and the outer shaft are concentric and rotate via bearing systems about the engine central longitudinal axis A, which is collinear with the longitudinal axes of the inner shaft and the outer shaft.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 43 may be varied. For example, gear system 43 may be located aft of combustor section 26 or even aft of turbine section 28, and fan section 22 may be positioned forward or aft of the location of gear system 43.

The engine 20 in one example is a high-bypass geared aircraft engine. In a further example, the engine 20 bypass ratio is greater than about six (6), with an example embodiment being greater than about ten (10), the geared architecture 43 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is the pressure measured prior to the inlet of the low pressure turbine 46 as related to the pressure at the outlet of the low pressure turbine 46 prior to an exhaust nozzle. The geared system 43 may be an epicycle gear train, such as a planetary gear system or other gear system, with a gear reduction ratio of greater than about 2.3:1. It should be understood, however, that the above parameters are only exemplary of embodiments of a geared architecture engine and that the present invention is applicable to other gas turbine engines including direct drive turbofans.

In some examples, an electric motor 70 is incorporated into the engine 20 and is capable of generating rotational power using electricity provided from an electric energy source. In some examples, a motor/generator can be utilized as the motor 70 and electric energy can be generated by rotational energy provided to the motor 70 from the spool 30. In such an example, the electric energy is provided to a power distribution system (see FIG. 2), and a controller can dictate the appropriate expenditure of the energy.

While illustrated in the example of FIG. 1 as being positioned aft of the low pressure turbine 46, one of skill in the art, having the benefit of this disclosure, will understand that the motor 70 can be placed at alternative axial positions within the gas turbine engine 20, and provide similar functions or operate in a similar manner.

Figure 2:
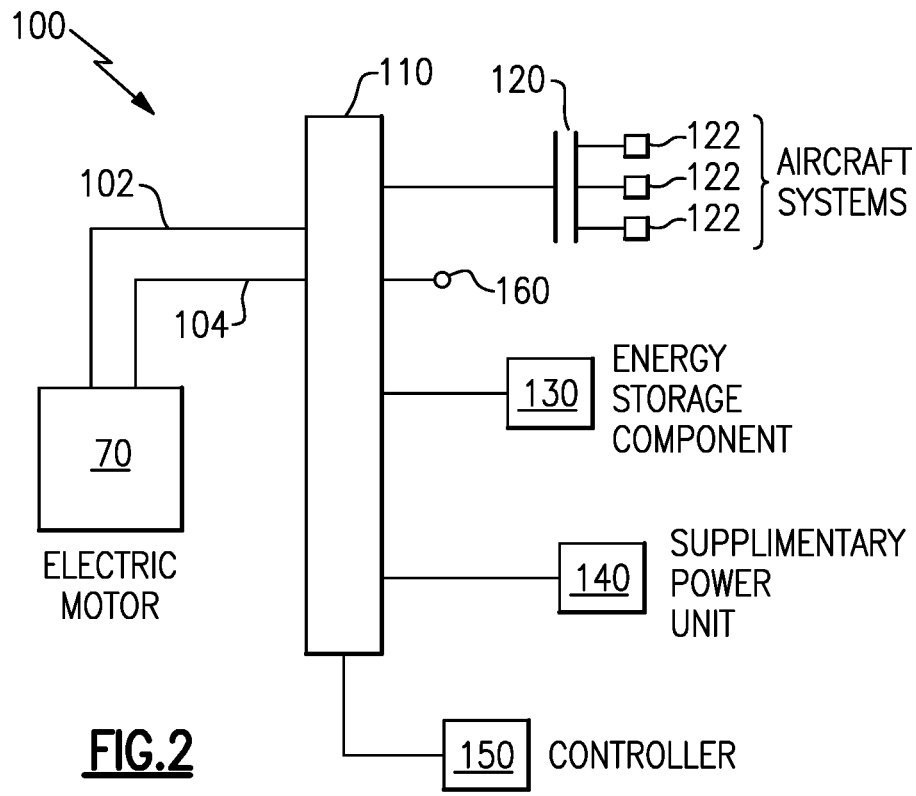
FIG. 2 illustrates an exemplary power distribution system for utilization in the engine of FIG. 1.

With continued reference to FIG. 1, FIG. 2 schematically illustrates a power distribution architecture 100 configured to receive power generated by, and provide power to, the electric motor 70 of FIG. 1. The electric motor 70 is, in this example, a motor/generator with an electric input 102 and an electric output 104. The input 102 and the output 104 are connected to a power distribution system 110. In the illustrated example, the power distribution system 110 is interconnected with an aircraft power distribution system. In alternative examples, the power distribution system 110 is limited to the specific engine 20, and only distributes electric power throughout the engine 20.

The power distribution system 110 is connected to a power bus 120 and provides power to multiple on-board aircraft systems 122. By way of example, the on-board aircraft systems 122 can include navigation systems, on-board entertainment systems, cabin lighting, and any other essential or non-essential electric systems. The power distribution system 110 is controlled by a controller 150. In some examples the controller 150 is a sub-controller or sub-system within a general aircraft controller or a general engine controller. In alternative examples, the controller 150 is a dedicated controller that serves only to control the power distribution system 110. One of skill in the art, having the benefit of this disclosure will understand that the controller 150 can be included within additional control systems beyond the specifically enumerated controllers.

Also connected to the power distribution system 110 is an energy storage component 130, and a supplementary power unit 140. The energy storage component 130 and the supplementary power unit 140 are collectively referred to as a stored power system. By way of example, the energy storage component 130 can be a battery, a super capacitor, or any similar rechargeable energy storage component. The supplementary power unit 140 is an electric power generation unit capable of generating power from an expendable resource. By way of example, the supplementary power unit 140 can be, in some examples, a combustion engine that operates off of hydrocarbon based fuel in either liquid or gaseous form, a proton exchange membrane (PEM) fuel cell, and the like. While illustrated herein as including both an energy storage component 130 and a supplementary power unit 140, it is understood that some embodiments could be constructed utilizing either an energy storage component 130 or a supplementary power unit 140. It should be noted that the supplementary power unit 140 can also provide power for non-propulsive purposes such as powering an aircraft environmental control system, starting the main turbine engines, and covering the electric demand of hotel loads (galley, in flight entertainment, etc). In some embodiments, the supplementary power unit 140 is also the aircraft auxiliary power unit.

As described above, with regards to FIG. 1, in some modes of operation the motor 70 is used to provide supplementary power to the engine 20. In such modes of operation, electric power is provided to the power distribution system 110 from the energy storage component 130, the supplementary power unit 140, or both. The electric energy is then provided to the motor 70, via the electric input 102, and the motor 70 converts the electric power to rotational energy. The rotational energy is mechanically translated to the low speed spool 30, supplementing the power generated by the turbine engine 20.

In other modes of operation, such as while the aircraft is at cruise, the motor 70 can be operated as a generator and electric energy is provided back to the power distribution system 110 from the motor 70 through output 104. In examples where the power distribution system 110 is interconnected with the aircraft power distribution system, the electric energy can be used to power on-board aircraft systems 122 and/or charge the energy storage unit 130.

The specific size, and charge capacity, of the energy storage component 130 and the supplementary power unit 140 depends on the specific needs of a given engine/aircraft as well as the expected flight profile. By way of example, if an aircraft is limited to shorter range flights, or is a smaller aircraft, or both, a single battery or similar device operating as both the energy storage unit 130 and the supplementary power unit 140 can suffice. However, if an aircraft includes/will include longer flight durations, or is a larger aircraft, the energy storage component 130 may be sized for short duration peak power needs, and the supplementary power unit 140 will be utilized to provide extended duration supplementary power.

In some further examples, the power distribution system 110 can optionally include a connection 160 to a ground based electric system. The connection 160 allows the power distribution system 110 to receive power from a ground based charging station, or other electric system, when the aircraft is parked and/or stationary. This allows the energy storage component 130 to be charged while the aircraft is landed, further facilitating the hybrid electric operations.

Figure 3:
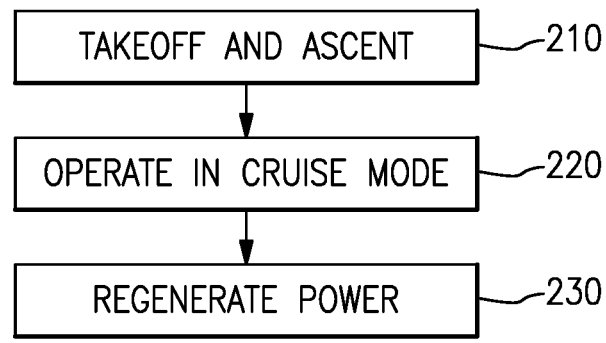
FIG. 3 illustrates a method for operating a gas turbine engine, under certain conditions.

With continued reference to FIGS. 1 and 2, FIG. 3 illustrates an exemplary method 200 for operating a gas turbine engine, such as the gas turbine engine 20 of FIG. 1. During initial aircraft operations, the engine 20 is operated in a takeoff and climb out mode during a "takeoff and ascent" step 210. As the engine 20 is sized to provide peak efficiency during other modes of operation, the engine 20 alone can be insufficient to generate the required thrust during takeoff and climb out. As such, during this mode of operation, the energy storage component 130, the supplementary power device 140, or both operate to provide electric power to the motor 70, thereby providing supplemental rotation to the low speed spool 30. The supplemental rotation increases the thrust to the required levels, allowing takeoff and climb out to occur.

Once at a desired altitude, the aircraft levels out into a cruise mode of operation in an "Operate in cruise mode" step 220. The engine 20 is sized to provide sufficient thrust during cruise mode, and the motor 70 is not required to provide supplemental rotation. Due to the physical connection, however, rotation of the low speed shaft 30 can be provided to the motor 70. In this case, the controller 150 switches the motor to a generator mode in a "regenerate power" step 230, and the motor 70 provides electric power back to the power distribution system 110 via the outlet 104. In some examples, the power provided to the power distribution system is, in turn, provided to a power bus 120 that powers on-board aircraft electric systems. In alternative examples, the power is used to charge the energy storage component 130.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section having a first compressor and a second compressor;
a turbine section having a first turbine and a second turbine,
the first compressor is connected to the first turbine via a first shaft;
the second compressor is connected to the second turbine via a second shaft;
a fan connected to the first shaft;
a motor connected to the first shaft such that rotational energy generated by the motor is translated to the first shaft;
a power distribution system connecting the motor to a stored power system including at least one of an energy storage unit and a supplementary power unit, wherein the power distribution system is configured to provide power from the stored power system to the motor in at least one mode of operation in a plurality of modes of operation, and configured such that electricity generated by the motor is provided to the power distribution system in at least one mode of operation in the plurality of modes of operation.

2. The gas turbine engine of claim 1, wherein the power distribution system is isolated within the gas turbine engine.

3. The gas turbine engine of claim 1, wherein the power distribution system is integrated with an aircraft power distribution system.

4. The gas turbine engine of claim 1, wherein the at least one supplementary power unit comprises one of a liquid hydrocarbon combustion engine, a gaseous hydrocarbon combustion engine, and a proton exchange membrane (PEM) fuel cell.

5. The gas turbine engine of claim 1, wherein the at least one energy storage unit comprises a rechargeable electric energy storage component.

6. The gas turbine engine of claim 1, wherein the plurality of modes of operation includes at least a takeoff mode of operation, a top of climb mode of operation and a cruise mode of operation, wherein the gas turbine engine is configured to operate at peak efficiency in said cruise mode of operation.

7. The gas turbine engine of claim 6, further comprising a controller, the controller configured to cause the motor to operate as an electric generator during at least one mode of operation other than the takeoff mode of operation and the top of climb mode of operation, and configured to cause the motor to provide boost power to the gas turbine engine during at least one of the takeoff and climb out modes of operation.

8. The gas turbine engine of claim 1, wherein the power distribution system includes an electric inlet configured to connect to, and receive power from, a ground based power station.

9. The gas turbine engine of claim 1, wherein the turbine section includes exactly two turbines.

10. The gas turbine engine of claim 1, wherein 100% of a rotational input to the fan is received from a connection to the first shaft.

11. The gas turbine engine of claim 10, wherein the fan is connected to the first shaft via a gear system.

12. The gas turbine engine of claim 1, wherein the fan is connected to a single shaft.

13. A gas turbine engine comprising:
a compressor section having a first compressor and a second compressor;
a turbine section having a first turbine and a second turbine,
the first compressor is connected to the first turbine via a first shaft;
the second compressor is connected to the second turbine via a second shaft;
a fan connected to the first shaft;
a motor connected to the first shaft such that rotational energy generated by the motor is translated to the first shaft;
a power distribution system connecting the motor to an energy storage unit and a supplementary power unit; and
wherein the supplementary power unit is electrically connected to said motor via said power distribution system such that electricity from the supplementary power unit drives rotation of the motor in at least one mode of operation in a plurality of modes of operation, and configured such that electricity generated by the motor is provided to the power distribution system in at least one mode of operation in the plurality of modes of operation.

14. The gas turbine engine of claim 13, wherein the supplementary power unit is a combustion engine driven by at least one of a liquid hydrocarbon based fuel and a gaseous hydrocarbon based fuel.

15. The gas turbine engine of claim 13, wherein the energy storage unit is a rechargeable electric storage unit.

16. The gas turbine engine of claim 15, wherein the power distribution system is configured such that at least a portion energy generated by said motor is stored within the energy storage component.

17. The gas turbine engine of claim 13, wherein the gas turbine engine includes at least a takeoff mode of operation, a top of climb mode of operation and a cruise mode of operation, wherein the gas turbine engine is configured to operate at peak efficiency in said cruise mode of operation.

18. The gas turbine engine of claim 17, wherein the power distribution system is configured such that electricity generated by the motor is provided to the energy storage unit.

19. The gas turbine engine of claim 17, further comprising a controller, the controller configured to cause the motor to operate as an electric generator during the cruise mode of operation, and configured to cause the motor to provide boost power to the gas turbine engine during at least one of the takeoff and climb out modes of operation.

* * * * *